(12) United States Patent
Kintaka

(10) Patent No.: US 7,605,103 B2
(45) Date of Patent: *Oct. 20, 2009

(54) TRANSLUCENT CERAMIC AND METHOD FOR MANUFACTURING THE SAME, AND OPTICAL COMPONENT AND OPTICAL DEVICE

(75) Inventor: Yuji Kintaka, Omihachiman (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 2 days.

This patent is subject to a terminal disclaimer.

(21) Appl. No.: 11/790,993

(22) Filed: Apr. 30, 2007

(65) Prior Publication Data

US 2007/0207913 A1 Sep. 6, 2007

Related U.S. Application Data

(63) Continuation of application No. PCT/JP2005/018928, filed on Oct. 14, 2005.

(30) Foreign Application Priority Data

Nov. 9, 2004 (JP) ............................. 2004-325431

(51) Int. Cl.
*C04B 35/00* (2006.01)
*G02B 6/10* (2006.01)
*C01F 11/02* (2006.01)

(52) U.S. Cl. ...................... 501/135; 501/134; 501/136; 501/137; 501/139; 385/130; 385/131; 423/594.16

(58) Field of Classification Search ................ 501/134, 501/135, 136, 137, 139; 385/131, 147, 130; 423/594.16

See application file for complete search history.

(56) References Cited

U.S. PATENT DOCUMENTS 4,019,915 A * 4/1977 Miyauchi et al. ............ 501/135

(Continued)

FOREIGN PATENT DOCUMENTS

GB        2 376 230 A       12/2002

(Continued)

OTHER PUBLICATIONS

Miller. High Density Sintering of Pure Barium Titanate. Journal of Materials Science 3 (1968) 436-439.*

(Continued)

*Primary Examiner*—Karl E Group
*Assistant Examiner*—Noah S Wiese
(74) *Attorney, Agent, or Firm*—Dickstein Shapiro LLP

(57) ABSTRACT

A translucent ceramic containing a main component represented by $Ba\{M_xB1_yB2_z\}_vO_w$ (wherein B1 is a trivalent metallic element, B2 is a quintavalent metallic element, M is at least one selected from the group consisting of Ti, Sn, Zr and Hf, $x+y+z=1$, $0 \leq x \leq 0.45$, $1.00 \leq z/y \leq 1.04$, $1.00 \leq v \leq 1.05$, and w is a positive number required to maintain electroneutrality), or $Ba\{M_x(B1_sB3_{1-s})_yB2_z\}_vO_w$ (wherein B3 is a bivalent metallic element, $0 \leq x \leq 0.9$, $1.00 \leq z/y \leq 2.40$, $0<s<1$, and B1, B2, x+y Z and w are the same as those in the other formula). The translucent ceramic has a high refractive index, a high anomalous dispersion and excellent optical properties. The translucent ceramic is useful, for instance, as a material of an objective lens in an optical pickup.

19 Claims, 4 Drawing Sheets

10

U.S. PATENT DOCUMENTS

| | | | |
|---|---|---|---|
| 7,396,790 B2 * | 7/2008 | Kuretake et al. | 501/135 |
| 2003/0181311 A1 * | 9/2003 | Tanaka et al. | 501/135 |

FOREIGN PATENT DOCUMENTS

| | | |
|---|---|---|
| JP | 5-127078 | 5/1993 |
| JP | 7-244865 | 9/1995 |
| WO | WO 02/49984 A1 | 6/2002 |

OTHER PUBLICATIONS

Shimooka et al. Preparation of translucent barium titanate ceramics from sol-gel-derived transparent monolithic gels. J. Mater. Chem., 2000, 10, 1511-1512.*

Written Opinion of the International Searching Authority dated Nov. 15, 2005.

Zurmuhlen et al., J. Appl. Phys., vol. 76, pp. 5864-5873 (1994).

Khalam et al., Materials Science and Engineering, vol. B107, pp. 264-270 (2004).

* cited by examiner

10

11

12

TRANSLUCENT CERAMIC AND METHOD FOR MANUFACTURING THE SAME, AND OPTICAL COMPONENT AND OPTICAL DEVICE

This is a continuation of application Serial No. PCT/JP2005/018928, filed Oct. 14, 2005.

TECHNICAL FIELD

The present invention relates to a translucent ceramic useful as an optical component such as a lens, a method for manufacturing the translucent ceramic, and an optical component and an optical device each including the translucent ceramic.

BACKGROUND ART

Glasses, plastics, or single crystals such as lithium niobate ($LiNbO_3$), have heretofore been used as materials of optical components, such as lenses, for use in optical devices such as optical pickups, as described in Patent Document 1 and Patent Document 2.

Glasses and plastics have high light transmittance and are easily processed into desired shapes. Thus, glasses and plastics have been used in optical components, primarily in lenses. $LiNbO_3$ single crystals are used in optical components, primarily in optical waveguides, in which the electro-optical characteristics and the birefringence of the $LiNbO_3$ single crystals are utilized. In optical devices, such as optical pickups, including such optical components, there has been a demand for smaller optical devices having lower profiles.

However, existing glasses and plastics have refractive indices of 2.00 or less (determined at a wavelength of 633 nm which, unless otherwise specified, the refractive index used herein is determined at that wavelength). In optical components and optical devices formed of glasses or plastics, therefore, the reduction in size and thickness is limited by these low refractive indices. Furthermore, plastics disadvantageously have poor moisture resistance and sometimes exhibit birefringence. Thus, it is difficult to allow incident light to pass efficiently through plastics and to converge the incident light.

On the other hand, the $LiNbO_3$ single crystal has a refractive index as high as 2.3, but it exhibits birefringence. The $LiNbO_3$ single crystal is therefore difficult to use in optical components such as lenses and has limited applications.

$Ba(Mg, Ta)O_3$ and $Ba(Zn, Ta)O_3$ translucent ceramics are known to exhibit no birefringence and have excellent optical properties, as described in Patent Document 3. These translucent ceramics have refractive indices of at least 2.01.

Recently, a high anomalous dispersion $\Delta\theta g, F$, which is one of measures of optical properties, is sometimes required. It will be further described below. Having an anomalous dispersion means that the wavelength dispersion characteristic is different from those of common optical glasses. A high anomalous dispersion $\Delta\theta g, F$ is useful for the correction of chromatic aberration. The anomalous dispersion is represented by negative values in the present specification and a high anomalous dispersion is represented by a large absolute value.

$Ba(Mg, Ta)O_3$ and $Ba(Zn, Ta)O_3$ translucent ceramics disclosed in Patent Document 3 have perovskite structures represented by a general formula $ABO_3$, and in particular, have complex-perovskite structures in which the B-site is composed of at least two elements. More specifically, the complex-perovskite structures principally include a bivalent metallic element composed of Mg and/or Zn and a pentavalent metallic element composed of Ta and/or Nb, at a molar ratio of about 1:2. Thus, the complex-perovskite structures substantially have electroneutrality. Furthermore, optical properties such as the refractive index and the Abbe number can be changed by replacing Mg, Ta and/or Zn of the B-site element with a quadrivalent element such as Sn or Zr.

However, the translucent ceramic described in Patent Document 3 disadvantageously has a low anomalous dispersion $\Delta\theta g, F$. For example, $Ba\{(Sn, Zr)Mg, Ta\}O_3$, $Ba(Zr, Zn, Ta)O_3$ and $Ba\{(Sn, Zr)Mg, Nb\}O_3$ have $\Delta\theta g, Fs$ as low as −0.013, −0.006 and −0.000, respectively.

Patent Document 1: Japanese Unexamined Patent Application Publication No. 5-127078.

Patent Document 2: Japanese Unexamined Patent Application Publication No. 7-244865.

Patent Document 3: International Publication WO 02/49984.

DISCLOSURE OF INVENTION

Problems to be Solved by the Invention

The present invention has been accomplished in view of the situation described above. Accordingly, it is an object of the present invention to provide a translucent ceramic having a high refractive index and a high anomalous dispersion, and a method for manufacturing the translucent ceramic.

Another object of the present invention is to provide an optical component having small overall dimensions and desired optical properties, and an optical device including the optical component.

Means for Solving the Problems

In a first aspect, a translucent ceramic according to the present invention is mainly composed of a component having a general formula of $Ba\{M_xB1_yB2_z\}_vO_w$. B1 is a trivalent metallic element, B2 is a pentavalent metallic element, M is at least one selected from the group consisting of Ti, Sn, Zr and Hf, $x+y+z=1$, $0 \leq x \leq 0.45$, $1.00 \leq z/y \leq 1.04$, $1.00 \leq v \leq 1.05$, and w is a positive number required to maintain electroneutrality.

In the first aspect, preferably, B1 is at least one selected from the group consisting of Y, In, Sc, Tb, Ho and Sm, and B2 is at least one selected from the group consisting of Ta and Nb.

In a second aspect, a translucent ceramic according to the present invention is mainly composed of a component having a general formula of $Ba\{M_x(B1_sB3_{1-s})_yB2_z\}_vO_w$. B1 is a trivalent metallic element, B2 is a pentavalent metallic element, B3 is a bivalent metallic element, M is at least one selected from the group consisting of Ti, Sn, Zr and Hf, $x+y+z=1$, $0 \leq x \leq 0.9$, $1.00 \leq z/y \leq 2.40$, $1.00 \leq v \leq 1.05$, $0 < s < 1$, and w is a positive number required to maintain electroneutrality.

In the second aspect, preferably, B1 is at least one selected from the group consisting of Y, In, Sc, Tb, Ho and Sm, B2 is at least one selected from the group consisting of Ta and Nb, and B3 is at least one selected from the group consisting of Mg and Zn.

Preferably, a translucent ceramic according to the present invention has a linear transmittance of visible light having a wavelength of 633 nm through a body of the translucent ceramic having a thickness of 0.4 mm (hereinafter simply referred to as "linear transmittance") as high as 20% or more.

Preferably, a translucent ceramic according to the present invention is a polycrystal to prevent birefringence.

The present invention is also directed to a method for manufacturing the translucent ceramic described above. A method for manufacturing a translucent ceramic according to the present invention includes the steps of forming a ceramic raw powder into a green ceramic compact having a predetermined shape, providing a fired composition having substantially the same composition as the ceramic raw powder, and firing the green ceramic compact in an atmosphere containing at least 90% by volume of oxygen while the fired composition is in contact with the green ceramic compact.

Furthermore, the present invention is also directed to an optical component formed of the translucent ceramic, and an optical device including the optical component.

ADVANTAGES OF THE INVENTION

The present invention provides a translucent ceramic having a high refractive index of at least 2.01 and a high anomalous dispersion $\Delta\theta g,F$ in the range of −0.021 to −0.014. Hence, the present invention can provide an optical component that has desired optical properties even at smaller sizes and that is useful for the correction of chromatic aberration in a white optical system such as a camera.

Figure 1:
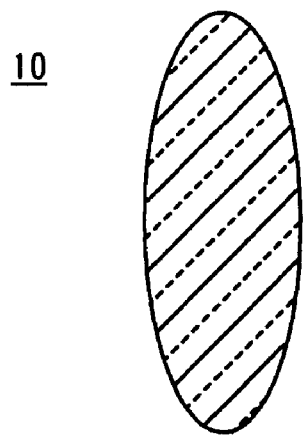
FIG. 1 is a cross-sectional view of a biconvex lens 10 according to a first embodiment of an optical component formed of a translucent ceramic according to the present invention.
Figure 2:
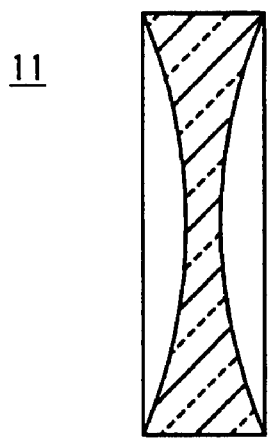
FIG. 2 is a cross-sectional view of a biconcave lens 11 according to a second embodiment of an optical component formed of a translucent ceramic according to the present invention.
Figure 3:
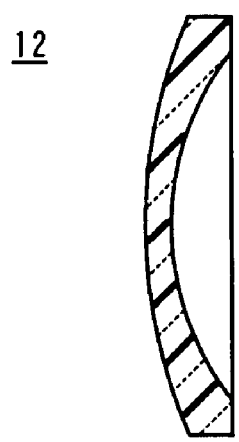
FIG. 3 is a cross-sectional view of a meniscus lens 12 according to a third embodiment of an optical component formed of a translucent ceramic according to the present invention.
Figure 4:
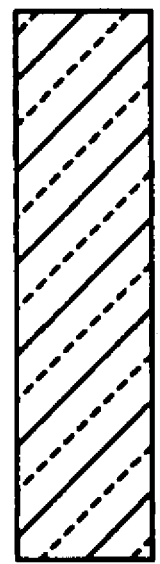
FIG. 4 is a cross-sectional view of an optical path length adjustment plate 13 according to a fourth embodiment of an optical component formed of a translucent ceramic according to the present invention.
Figure 5:
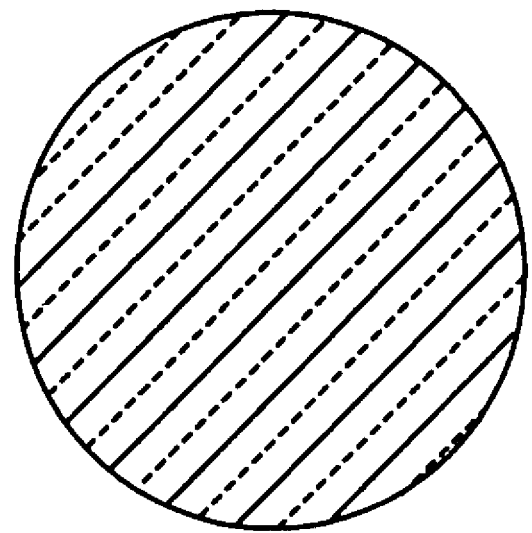
FIG. 5 is a cross-sectional view of a spherical lens 14 according to a fifth embodiment of an optical component formed of a translucent ceramic according to the present invention.

In the drawings the following reference numerals reference the following elements.

1 recording medium
2 objective lens
3 half-mirror
4 collimating lens
5 semiconductor laser
6 converging lens
7 light receiving element
8 laser beam
9 optical pickup
10 biconvex lens
11 biconcave lens
12 meniscus lens
13 optical path length adjustment plate
14 spherical lens

BEST MODE FOR CARRYING OUT THE INVENTION

A main component of a translucent ceramic according to the present invention has a perovskite structure represented by $AB_vO_w$, wherein $1.00 \leq v \leq 1.05$, and w is a positive number required to maintain electroneutrality. When the A site and B site are combinations of a plurality of elements having different valences, the compositions of the elements are determined so that the total valence of the A site is substantially bivalent and the total valence of the B site is substantially quadrivalent. The variable w is about 3 and may be slightly greater or less than 3 to maintain electroneutrality. A first aspect and a second aspect of a translucent ceramic according to the present invention are individually described below.

In a translucent ceramic according to the first aspect of the present invention, the main component is represented by $Ba\{M_xB1_yB2_z\}_vO_w$, wherein B1 is a trivalent metallic element, B2 is a pentavalent metallic element, M is at least one selected from the group consisting of Ti, Sn, Zr and Hf, $x+y+z=1$, $0 \leq x \leq 0.45$, $1.00 \leq z/y \leq 1.04$, $1.00 \leq v \leq 1.05$, and w is a positive number required to maintain electroneutrality. Thus, the main component of the translucent ceramic is a complex-perovskite. The B site includes a trivalent metallic element B1 and a pentavalent metallic element B2 at a molar ratio of about 1:1. This complex-perovskite is different from a complex-perovskite disclosed in Patent Document 3, in which a bivalent metallic element and pentavalent metallic element at a molar ratio of about 1:2 constitute the B site. As a result, a higher anomalous dispersion of a translucent ceramic is achieved according to the present invention compared with a translucent ceramic described in Patent Document 3, and results from the difference in the type and the ratio of elements constituting the B site.

The metallic elements constituting B1 and B2 may be of any type provided that they can maintain the perovskite structure without compromising the objects of the present invention, for example, by devitrification. Specifically, B1 is preferably at least one selected from the group consisting of Y, In, Sc, Tb, Ho and Sm, and B2 is preferably Ta and/or Nb. This preferred embodiment can achieve both increased anomalous dispersion and higher linear transmittance.

In most optical glasses, there is generally a substantially linear relationship between the partial dispersion ratio $\theta g,F$ and the Abbe number $v_d$. Such glasses are referred to as a normal partial dispersion glass or normal glass. A glass not satisfying the linear relationship is referred to as an anomalous partial dispersion glass or abnormal glass. The degree of anomalous dispersion is represented by the deviation of the partial dispersion ratio from a standard line obtained by connecting the points of normal glass references NSL7 and PBM2.

The partial dispersion ratio $\theta g,F$ is expressed by Equation 1:

$$\theta g,F = (n_g - n_F)/(n_F - n_c) \qquad \text{Equation 1}$$

wherein n denotes the refractive index, and the subscripts denote the wavelength of incident light. The g line has a wavelength of 435.83 nm. The F line has a wavelength of 486.13 nm. The C line has a wavelength of 656.27 nm.

The Abbe number $v_d$ is expressed by Equation 2:

$$v_d = (n_d - 1)/(n_F - n_c) \qquad \text{Equation 2}$$

where n and the subscripts are as just described and the d line has a wavelength of 587.56 nm.

A higher anomalous dispersion indicates that the wavelength dispersion of the refractive index is different from those of common glass optical materials. The higher anomalous dispersion is therefore useful for the correction of chromatic aberration in an optical system.

A translucent ceramic according to the present invention has a negative and high anomalous dispersion $\Delta\theta g,F$ in the range of $-0.021$ to $-0.014$. Thus, a translucent ceramic according to the present invention is useful for an optical system in which the correction of chromatic aberration is important.

The reason for high anomalous dispersion of the present material is not totally clear, but may be presumed as follows. A higher anomalous dispersion requires a large variation in $n_g$ while $n_F$, $n_c$ and $n_d$ are not changed to a large extent. Among these four refractive indices, $n_g$ is a refractive index at a wavelength closest to ultraviolet rays. In a crystalline material like a translucent ceramic according to the present invention, the refractive index dispersion in a visible light region is probably caused by the absorption of light by a band gap. Thus, in order to largely change only $n_g$, the frequency of light absorption at a shorter wavelength having a larger energy may be changed. This may be achieved by changing the state density at a deep level of valence band or the state density at a high conduction band. In the translucent ceramic described in Patent Document 3, Mg or Zn of the B-site element constitutes a deep level of valence band. However, the state density at a deep level of valence band, in a translucent ceramic according to the present invention, is likely changed by using a trivalent metallic element, in particular, Y, In, Sc, Tb, Ho or Sm as the B-site element. The present invention, however, is not limited to this explanation.

The specific composition of a translucent ceramic according to the first aspect of the present invention will next be described.

A translucent ceramic according to the first aspect of the present invention contains a main component having a composition formula of $Ba\{M_xB1_yB2_z\}_vO_w$. B1 is a trivalent metallic element, B2 is a pentavalent metallic element, M is at least one selected from the group consisting of Ti, Sn, Zr and Hf, $x+y+z=1$, $0 \leq x \leq 0.45$, $1.00 \leq z/y \leq 1.04$, $1.00 \leq v \leq 1.05$, and w is a positive number required to maintain electroneutrality.

The conditions of $1.00 \leq z/y \leq 1.04$ and $1.00 \leq v \leq 1.05$ provide the optimum condition for translucency due to the perovskite structure. When the value of z/y or v is out of the range described above, the linear transmittance decreases to below 20%.

Furthermore, the B site in a translucent ceramic according to the present invention may be replaced with a quadrivalent element, for example, at least one selected from the group consisting of Sn, Zr, Ti and Hf. This replacement can change optical properties. For example, the refractive index tends to change in proportion to the amount of replacement. In particular, replacement with Ti can significantly increase the refractive index.

Furthermore, the refractive index of a translucent ceramic can be adjusted as desired by the replacement with a mixture of quadravalent elements, for example, more than one selected from the group consisting of Sn, Zr, Ti and Hf at an appropriate ratio. When the amount of replacement x of the quadravalent element M exceeds 0.45, the linear transmittance decreases below 20%. Subject to this, the amounts of the elements in a mixture can be adjusted as desired.

A translucent ceramic according to the second aspect of the present invention will now be described.

In a translucent ceramic according to the second aspect of the present invention, the main component is represented by $Ba\{M_x(B1_sB3_{1-s})_yB2_z\}_vO_w$, wherein B1 is a trivalent metallic element, B2 is a pentavalent metallic element, B3 is a bivalent metallic element, M is at least one selected from the group consisting of Ti, Sn, Zr and Hf, $x+y+z=1$, $0 \leq x \leq 0.9$, $1.00 \leq z/y \leq 2.40$, $1.00 \leq v \leq 1.05$, $0<s<1$, and w is a positive number required to maintain electroneutrality.

In other words, the translucent ceramic according to the second aspect of the present invention is an s:1−s solid solution of the translucent ceramic according to the first aspect of the present invention, in which the B site is composed of a trivalent metallic element(s) and pentavalent metallic element(s) at a molar ratio of about 1:1, as opposed to the translucent ceramic described in Patent Document 3 in which the B site is composed of bivalent metallic element(s) and a pentavalent metallic element at a molar ratio of about 1:2.

The composition described above allows not only an anomalous dispersion, but also the optical properties, such as the linear transmittance, the refractive index and the Abbe number, to be changed considerably.

Specific compositions of a translucent ceramic according to the second aspect of the present invention will be described in the examples.

The conditions of $1.00 \leq z/y \leq 2.40$ and $1.00 \leq v \leq 1.05$ provide the optimum condition for the translucency due to the perovskite structure. When the value of z/y or v is out of a predetermined range, the linear transmittance decreases below 20%.

Furthermore, the B site in the translucent ceramic according to the second aspect of the present invention, may be replaced with a quadravalent element, for example, at least one selected from the group consisting of Sn, Zr, Ti and Hf. This replacement can change optical properties. For example, the refractive index tends to change in proportion to the amount of replacement. In particular, a replacement with Ti can significantly increase the refractive index.

Furthermore, the refractive index of a translucent ceramic can be adjusted as desired by the replacement with a mixture of quadrivalent elements, for example, more than one selected from the group consisting of Sn, Zr, Ti and Hf at an appropriate ratio. The individual amounts of replacement in a mixture of quadrivalent elements M can be varied as long as it does not exceed 0.90. When x exceeds 0.90, the linear transmittance decreases below 20%.

A composition of a translucent ceramic according to the present invention may contain inevitable contaminants, provided that the objects of the present invention are not compromised. For example, impurities contained in an oxide or a carbonate used as a raw material and contaminants in the production process include $SiO_2$, $Fe_2O_3$, $B_2O_3$, CaO, $Al_2O_3$, SrO, $WO_3$, $Bi_2O_3$, $Sb_2O_5$ and rare-earth oxides such as $La_2O_3$.

A method for manufacturing a translucent ceramic according to the present invention will be described below.

To manufacture a translucent ceramic, a green ceramic compact having a predetermined shape is provided by forming a ceramic raw powder. A fired composition having substantially the same composition as the ceramic raw powder is also provided. Then, the green ceramic compact is fired in an atmosphere containing at least 90% by volume of oxygen while the fired composition is in contact with the green ceramic compact.

In the manufacturing method, the fired composition is a powder prepared, for example, by calcining a raw material prepared to have the same composition as the ceramic after compact calcination, followed by pulverization. The fired composition can prevent volatile components in the ceramic compact from vaporizing during firing. Thus, firing is preferably performed while the green ceramic compact is embedded in the fired composition powder. The fired composition is not limited to a powder and may be a compact or a sintered compact.

Preferably, the fired composition has the same composition as the ceramic raw powder of the green ceramic compact. The fired composition may have substantially the same composition as the green ceramic raw powder. The clause "the fired composition has substantially the same composition as the ceramic raw powder of the green ceramic compact" means that the fired composition is an equivalent composition containing the same constituent elements although it is not necessarily the same composition as the ceramic raw powder of the green ceramic compact. Furthermore, the fired composition does not necessarily have a composition that can impart translucency.

Furthermore, the pressure at which firing is conducted may be atmospheric pressure or below atmospheric pressure. In other words, firing does not require a pressurized atmosphere, such as in hot isostatic press (HIP).

While a translucent ceramic according to the present invention has a high linear transmittance, an antireflection film (AR film) formed on a surface can further increase the linear transmittance. Preferably, the antireflection film is formed of a dielectric such as MgO. For example, when the linear transmittance is 74.5% and the refractive index is 2.069, the maximum theoretical value of the linear transmittance is 78.4% according to Fresnel's law. The relative transmittance based on the theoretical value is thus 95.0%. This indicates that there is little transmission loss in a specimen. An antireflection film formed on a surface of a specimen can therefore give an substantially theoretical linear transmittance.

A translucent ceramic according to the present invention can be used in optical components, for example, lenses such as a biconvex lens 10, a biconcave lens 11, a meniscus lens 12, an optical path length adjustment plate 13 and a spherical lens 14, as illustrated in FIGS. 1 to 5, respectively.

An optical device including such an optical component will be described below, taking an optical pickup as an example.

Figure 6:
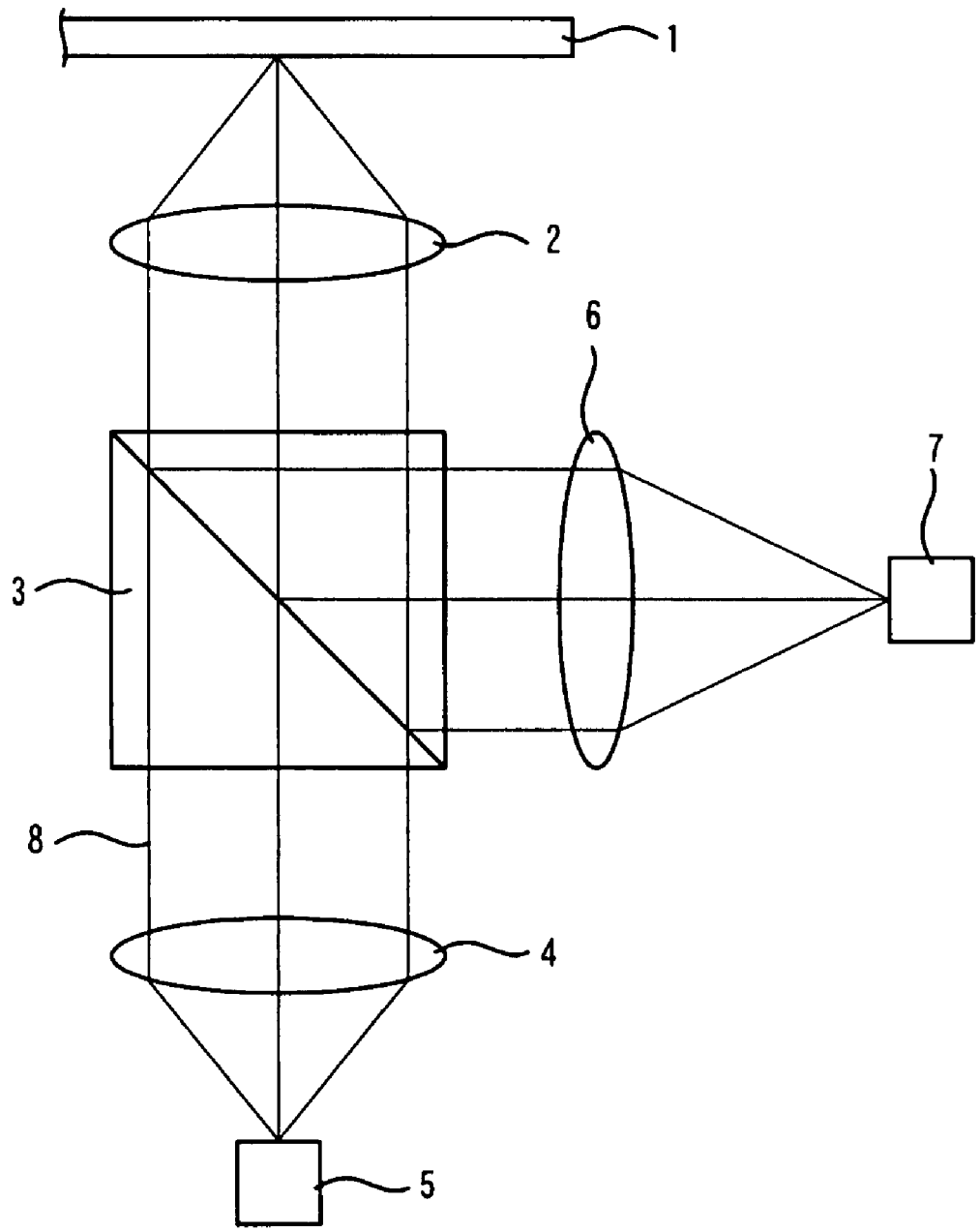
FIG. 6 is a schematic front view of an optical pickup 9 as an example of an optical device including an optical component formed of a translucent ceramic according to the present invention.

As illustrated in FIG. 6, a recording medium 1 in an optical pickup 9, such as a compact disc or a MiniDisc (Trade name), is irradiated with a coherent laser beam 8. Information stored on the recording medium 1 is regenerated from the reflected light.

Such an optical pickup 9 includes a collimating lens 4, which converts a laser beam 8 emitted from a semiconductor laser 5 light source into parallel light, and a half-mirror 3 disposed on the light path of the parallel light. The half-mirror 3 allows incident light from the collimating lens 4 to pass therethrough, but changes the direction of movement of reflected light from the recording medium 1, for example, by about 90 degrees.

The optical pickup 9 further includes an objective lens 2, which converges incident light passing through the half-mirror 3 on a recording surface of the recording medium 1. The objective lens 2 also efficiently transmits the reflected light from the recording medium 1 to the half-mirror 3. The half-mirror 3 changes the direction of movement of the reflected light by reflectively changing the phase of the reflected light.

The optical pickup 9 further includes a converging lens 6 for converging the reflected and deflected light. The optical pickup 9 further includes a light receiving element 7, which regenerates the information from the reflected light, at the focal point of the reflected light.

Use of a translucent ceramic according to the present invention as a material of the objective lens 2 in such an optical pickup 9 can reduce the size and the thickness of the optical pickup 9 because of the large refractive index of the translucent ceramic according to the present invention.

A translucent ceramic according to the present invention will be further described in the following examples.

EXAMPLE 1

Example 1 corresponds to the first aspect of the present invention.

High purity powders of $BaCO_3$, $In_2O_3$, $Y_2O_3$, $Ta_2O_5$, $Nb_2O_5$, $SnO_2$, $ZrO_2$, $TiO_2$ and $HfO_2$ were prepared as raw materials. The raw materials were weighed such that samples represented by a general formula of $Ba\{M_x(Y_{1-t}In_t)_y(Ta_{1-u}Nb_u)_z\}_vO_w$ (wherein M is at least one selected from the group consisting of Ti, Sn, Zr and Hf) and listed in Table 1 could be prepared. The raw materials were wet-blended in a ball mill for 16 hours. The mixture was dried and was calcined at 1200° C. for 3 hours to produce a calcined powder. After the calcination, the value of w was almost three.

In the column "Type and content of M" in Table 1, the content of M is the same as the value of x when M is composed of one element. When M is composed of two elements, the sum of the contents of the two elements is equal to the value of x.

Then the calcined powder, water and an organic binder were charged in a ball mill and were wet-grinded for 16 hours. The organic binder was ethyl cellulose but other organic binders could have been used. Any material, such as polyvinyl alcohol, that functions as a binder for a ceramic compact and vaporizes into carbon dioxide or water vapor by the reaction with oxygen in the air at about 500° C. before the temperature reaches the sintering temperature in a firing process can be used as the organic binder.

The ground product was dried and granulated through a 50-mesh screen. The resulting powder was pressed at 196 MPa into a discoidal green ceramic compact having a diameter of 30 mm and a thickness of 2 mm.

Next, the green ceramic compact was embedded in a previously fired powder having the same composition as a ceramic raw powder contained in the green ceramic compact. The embedded compact was placed in a furnace and was heated in an air atmosphere to remove the binder. Subsequently, oxygen was supplied to the air atmosphere while the temperature was increased. The oxygen content in the firing atmosphere was increased to about 95% by volume at a maximum temperature of 1650° C. While maintaining this firing temperature and oxygen content, the ceramic compact was fired for 20 hours to produce a sintered compact.

The resulting sintered compact was subjected to mirror-like finishing to produce a discoidal translucent ceramic sample having a thickness of 0.4 mm.

The linear transmittance and the refractive index of the sample were determined at a wavelength λ of 633 nm. The linear transmittance, which is a measure of translucency, was measured with a spectrophotometer (UV-2500) from Shimadzu Corporation. The target linear transmittance in the present invention is at least 20%. The refractive index was measured with a prism coupler (MODEL 2010) from Metricon Corporation.

The refractive indices at wavelengths λ of 409 nm, 532 nm, and 833 nm were also measured with the prism coupler. The refractive indices measured at these four wavelengths (409 nm, 532 nm, 633 nm, and 833 nm) were used to calculate the constants a, b and c in relational Equation 3 between the wavelength and the refractive index. Thus, the relationship between the wavelength and the refractive index was determined.

$n = a/\lambda^4 + b/\lambda^2 + c$ (wherein n denotes the refractive index, λ denotes the wavelength, and a, b, and c are constants). Equation 3

The refractive indices necessary to calculate the Abbe number ($v_d$) were determined by this equation at three wavelengths (F line: 486.13 nm, d line: 587.56 nm, and C line: 656.27 nm). The Abbe number was determined by the definitional Equation 2.

The refractive index $n_g$ for the g line (435.83 nm) was determined by Equation 3. The partial dispersion ratio θg,F was calculated by Equation 1.

The anomalous dispersion Δθg,F was determined by the following method, which is well known by a person skilled in the art. NSL7 and PBM2 were taken as reference glasses. The difference between a straight line connecting the points of these two glasses and θg,F of the sample in a θg,F–$v_d$ graph was determined as Δθg,F.

The linear transmittance, the refractive index, the Abbe number and the anomalous dispersion of the samples are summarized in Table 1.

In Table 1, any sample numbers marked with an asterisk are outside the scope of the present invention.

All the samples falling within the scope of the present invention had high anomalous dispersions in the range of −0.021 to −0.014.

By contrast, sample numbers 1 and 5, in which the values of z/y are outside the range 1.00≦z/y≦1.04 of the present invention, have low linear transmittances of below 20%.

Sample numbers 6 and 10, in which the values of v are outside the range 1.00≦v≦1.05 of the present invention, have low linear transmittances of below 20%.

Sample number 15, in which the amount of replacement x of the quadrivalent metallic element M exceeds 0.45, has a low linear transmittance of below 20%.

Figure 7:
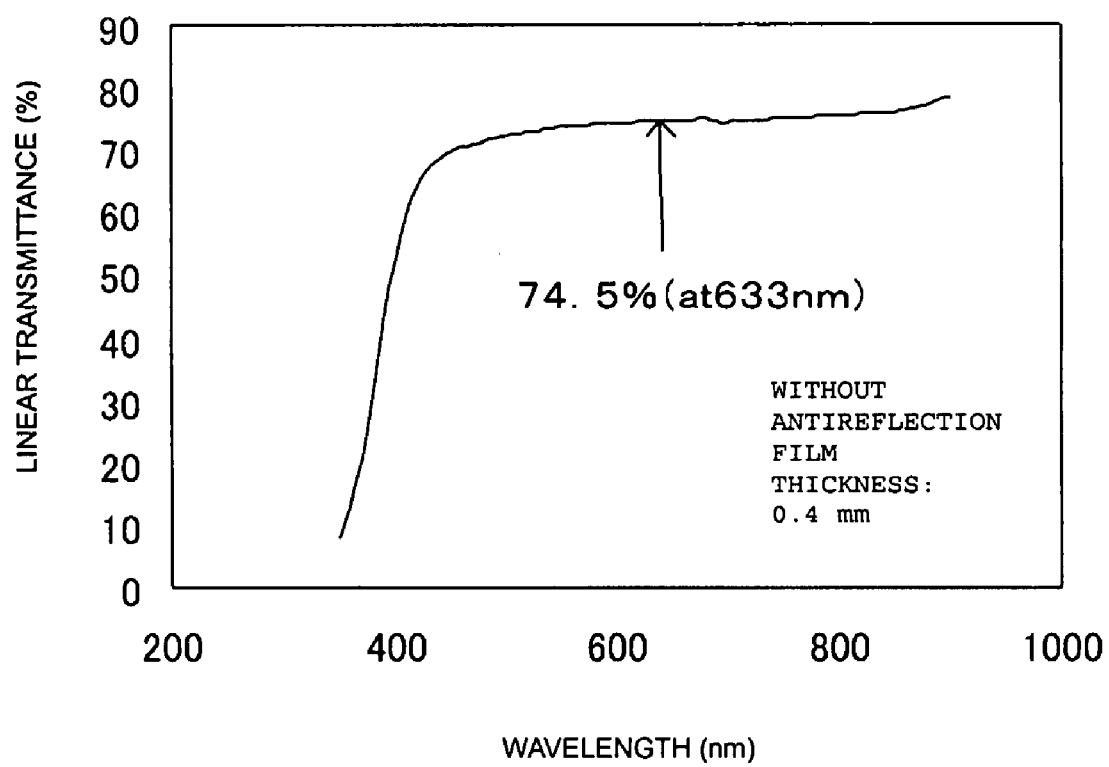
FIG. 7 is a graph illustrating the wavelength dependence of the linear transmittance of a translucent ceramic manufactured according to an example of the present invention.

Among the samples listed in Table 1, sample 3 which has a high refractive index and a high linear transmittance was evaluated for the dependence of linear transmittance on wavelength in the wavelength range of visible light (λ=350 to 900 nm). FIG. 7 shows the result.

The refractive indices of the sample 3 in TE and TM modes were measured at λ=633 nm. Table 2 shows the results.

TABLE 1

| Sample number | Type and content of M | t | u | x | y | z | z/y | v | Linear transmittance (%) 633 nm | Refractive index 633 nm | Abbe number $v_d$ | Anomalous dispersion Δθg,F |
|---|---|---|---|---|---|---|---|---|---|---|---|---|
| *1 | None | 0 | 0 | 0.00 | 0.503 | 0.497 | 0.99 | 1.020 | 16.0 | 2.0690 | 29.7 | −0.017 |
| 2 | None | 0 | 0 | 0.00 | 0.500 | 0.500 | 1.00 | 1.020 | 40.2 | 2.0690 | 29.7 | −0.017 |
| 3 | None | 0 | 0 | 0.00 | 0.495 | 0.505 | 1.02 | 1.020 | 74.5 | 2.0691 | 29.8 | −0.019 |
| 4 | None | 0 | 0 | 0.00 | 0.490 | 0.510 | 1.04 | 1.020 | 58.2 | 2.0690 | 29.7 | −0.018 |
| *5 | None | 0 | 0 | 0.00 | 0.488 | 0.512 | 1.05 | 1.020 | 17.9 | 2.0689 | 29.7 | −0.018 |
| *6 | None | 0 | 0 | 0.00 | 0.495 | 0.505 | 1.02 | 0.990 | 8.3 | 2.0691 | 29.6 | −0.018 |
| 7 | None | 0 | 0 | 0.00 | 0.495 | 0.505 | 1.02 | 1.000 | 33.0 | 2.0691 | 29.7 | −0.019 |
| 8 | None | 0 | 0 | 0.00 | 0.495 | 0.505 | 1.02 | 1.040 | 70.1 | 2.0690 | 29.9 | −0.020 |
| 9 | None | 0 | 0 | 0.00 | 0.495 | 0.505 | 1.02 | 1.050 | 62.5 | 2.0689 | 29.9 | −0.021 |
| *10 | None | 0 | 0 | 0.00 | 0.495 | 0.505 | 1.02 | 1.060 | 11.2 | 2.0689 | 30.0 | −0.021 |
| 11 | Ti: 0.10 | 0 | 0 | 0.10 | 0.446 | 0.454 | 1.02 | 1.020 | 70.5 | 2.0984 | 27.2 | −0.018 |
| 12 | Ti: 0.20 | 0 | 0 | 0.20 | 0.396 | 0.404 | 1.02 | 1.020 | 58.8 | 2.1276 | 24.8 | −0.016 |
| 13 | Ti: 0.40 | 0 | 0 | 0.40 | 0.297 | 0.303 | 1.02 | 1.020 | 32.5 | 2.1861 | 22.7 | −0.014 |
| 14 | Ti: 0.45 | 0 | 0 | 0.45 | 0.272 | 0.278 | 1.02 | 1.020 | 23.4 | 2.2010 | 22.3 | −0.014 |
| *15 | Ti: 0.50 | 0 | 0 | 0.50 | 0.248 | 0.252 | 1.02 | 1.020 | 18.1 | 2.2156 | 21.8 | −0.013 |
| 16 | Sn: 0.10 | 0 | 0 | 0.10 | 0.446 | 0.454 | 1.02 | 1.020 | 74.4 | 2.0666 | 30.1 | −0.017 |
| 17 | Sn: 0.20 | 0 | 0 | 0.20 | 0.396 | 0.404 | 1.02 | 1.020 | 71.5 | 2.0648 | 30.2 | −0.018 |
| 18 | Sn: 0.40 | 0 | 0 | 0.40 | 0.297 | 0.303 | 1.02 | 1.020 | 30.8 | 2.0644 | 30.1 | −0.017 |
| 19 | Zr: 0.10 | 0 | 0 | 0.10 | 0.446 | 0.454 | 1.02 | 1.020 | 73.5 | 2.0738 | 29.6 | −0.021 |
| 20 | Zr: 0.20 | 0 | 0 | 0.20 | 0.396 | 0.404 | 1.02 | 1.020 | 42.5 | 2.0783 | 29.6 | −0.017 |
| 21 | Zr: 0.40 | 0 | 0 | 0.40 | 0.297 | 0.303 | 1.02 | 1.020 | 20.8 | 2.0812 | 29.6 | −0.014 |
| 22 | Hf: 0.10 | 0 | 0 | 0.10 | 0.446 | 0.454 | 1.02 | 1.020 | 70.8 | 2.0711 | 29.9 | −0.019 |
| 23 | Hf: 0.20 | 0 | 0 | 0.20 | 0.396 | 0.404 | 1.02 | 1.020 | 38.9 | 2.0748 | 29.9 | −0.020 |
| 24 | Hf: 0.40 | 0 | 0 | 0.40 | 0.297 | 0.303 | 1.02 | 1.020 | 21.1 | 2.0765 | 30.0 | −0.020 |
| 25 | Ti: 0.10, Sn: 0.10 | 0 | 0 | 0.20 | 0.396 | 0.404 | 1.02 | 1.020 | 70.6 | 2.0825 | 28.6 | −0.017 |
| 26 | Zr: 0.10, Hf: 0.10 | 0 | 0 | 0.20 | 0.396 | 0.404 | 1.02 | 1.020 | 71.1 | 2.0725 | 29.6 | −0.020 |
| 27 | None | 0.5 | 0 | 0.00 | 0.495 | 0.505 | 1.02 | 1.020 | 69.7 | 2.0844 | 30.1 | −0.018 |
| 28 | None | 1 | 0 | 0.00 | 0.495 | 0.505 | 1.02 | 1.020 | 63.5 | 2.0997 | 30.4 | −0.018 |
| 29 | None | 0 | 0.5 | 0.00 | 0.495 | 0.505 | 1.02 | 1.020 | 72.2 | 2.0950 | 27.7 | −0.016 |
| 30 | None | 0 | 1 | 0.00 | 0.495 | 0.505 | 1.02 | 1.020 | 70.8 | 2.1210 | 25.6 | −0.014 |
| 31 | None | 0.5 | 0.5 | 0.00 | 0.495 | 0.505 | 1.02 | 1.020 | 67.7 | 2.0897 | 27.9 | −0.016 |
| 32 | None | 0.5 | 1 | 0.00 | 0.495 | 0.505 | 1.02 | 1.020 | 69.1 | 2.1027 | 25.8 | −0.014 |
| 33 | None | 1 | 0.5 | 0.00 | 0.495 | 0.505 | 1.02 | 1.020 | 63.3 | 2.0974 | 28.0 | −0.016 |
| 34 | None | 1 | 1 | 0.00 | 0.495 | 0.505 | 1.02 | 1.020 | 63.5 | 2.1104 | 25.9 | −0.014 |

TABLE 2

| Sample number | Refractive index n (λ = 633 nm) | |
|---|---|---|
| | TE mode | TM mode |
| 3 | 2.0691 | 2.0691 |

In Table 2, the refractive indices in the TE mode and the TM mode are the same, indicating the absence of birefringence.

The composition of the sample 3 was subjected to slip casting to produce a green ceramic compact two inches square. The green ceramic compact was fired at 1650° C. to produce a sintered compact. This sample 3a produced through the slip casting was produced in the same way as the sample 3 listed in Table 1, except that the forming method was changed from press forming to slip casting.

The sample 3a produced through the slip casting was evaluated for the linear transmittance, the refractive index and the Abbe number by the same evaluation method as in the sample 3 listed in Table 1. Table 3 shows the results. Table 3 also includes the linear transmittance, the refractive index and the Abbe number of the sample 3 listed in Table 1 produced through the press forming.

TABLE 3

| Sample number | Forming method | Linear transmittance (%) | Refractive index | Abbe number $v_d$ |
|---|---|---|---|---|
| 3 | Press forming | 74.5 | 2.0691 | 29.8 |
| 3a | Slip casting | 74.7 | 2.0691 | 29.8 |

As shown in Table 3, the linear transmittance, the refractive index and the Abbe number are the same or substantially the same for the press forming and the slip casting. This demonstrates that the optical properties of a translucent ceramic according to the present invention are excellent, and independent of the molding method.

The composition of the sample 3 was fired at a different firing temperature of 1700° C. to produce another sintered compact. This sample 3b was produced in the same way as the sample 3 listed in Table 1, except that the firing temperature was changed.

The linear transmittance, the refractive index and the Abbe number of the sample 3b prepared at the different firing temperature was measured by the same evaluation method as in the sample 3 listed in Table 1. Table 4 shows the results. Table 4 also includes the linear transmittance, the refractive index and the Abbe number of the sample 3 listed in Table 1, which was fired at a temperature of 1650° C.

TABLE 4

| Sample number | Firing temperature | Linear transmittance (%) | Refractive index | Abbe number $v_d$ |
|---|---|---|---|---|
| 3 | 1650° C. | 74.5 | 2.0691 | 29.8 |
| 3b | 1700° C. | 74.9 | 2.0691 | 29.8 |

As shown in Table 4, the linear transmittance, the refractive index and the Abbe number are the same or substantially the same for the different firing temperatures. This demonstrates that a translucent ceramic according to the present invention can be produced at different firing temperatures.

EXAMPLE 2

While In and Y were used as the tervalent metallic elements in Example 1, Sc, Tb, Ho and Sm were used in Example 2.

High purity powders of $BaCO_3$, $Sc_2O_3$, $Tb_2O_3$, $Ho_2O_3$, $Sm_2O_3$, $Ta_2O_5$, $Nb_2O_5$, $SnO_2$, $ZrO_2$, $TiO_2$ and $HfO_2$ were prepared as raw materials. The raw powders were weighed such that samples represented by a general formula of $Ba\{M_xB1_yB2_z\}_vO_w$ (wherein B1 is a trivalent metallic element, B2 is a pentavalent metallic element, and M is at least one selected from the group consisting of Ti, Sn, Zr and Hf) and listed in Table 5 could be prepared. The raw powders were wet-blended in a ball mill for 16 hours. The mixture was dried and was calcined at 1200° C. for 3 hours to produce a calcined powder. After the calcination, the value of w was almost three.

Then, a translucent ceramic sample was produced in the same way as in Example 1. The linear transmittance, the refractive index, the Abbe number and the anomalous dispersion were evaluated in the same way. Table 5 shows the results.

TABLE 5

| Sample Number | Type and content of M | Type of B1 | Type of B2 | x | y | z | z/y | v | Linear transmittance (%) 633 nm | Refractive index 633 nm | Abbe number $v_d$ | Anomalous dispersion $\Delta \theta$ g, F. |
|---|---|---|---|---|---|---|---|---|---|---|---|---|
| 101 | None | Sc | Ta | 0 | 0.495 | 0.505 | 1.02 | 1.020 | 67.1 | 2.0612 | 29.7 | −0.018 |
| 102 | None | Sc | Nb | 0 | 0.495 | 0.505 | 1.02 | 1.020 | 55.2 | 2.1135 | 24.2 | −0.015 |
| 103 | None | Tb | Ta | 0 | 0.495 | 0.505 | 1.02 | 1.020 | 51.0 | 2.0922 | 29.5 | −0.019 |
| 104 | None | Ho | Ta | 0 | 0.495 | 0.505 | 1.02 | 1.020 | 43.2 | 2.0910 | 29.5 | −0.018 |
| 105 | None | Sm | Ta | 0 | 0.495 | 0.505 | 1.02 | 1.020 | 40.8 | 2.0988 | 29.4 | −0.017 |

All the samples listed in Table 5 were within the scope of the present invention and had high anomalous dispersions in the range of −0.021 to −0.014.

EXAMPLE 3

Example 3 corresponds to the second aspect of the present invention.

High purity powders of $BaCO_3$, $In_2O_3$, $Y_2O_3$, $MgCO_3$, $ZnO$, $Ta_2O_5$, $SnO_2$, $ZrO_2$, $TiO_2$ and $HfO_2$ were prepared as raw materials. The raw powders were weighed such that samples represented by a general formula of $Ba\{M_x(B1_sB3_{1-s})_yB2_z\}_vO_w$ (wherein B1 is a trivalent metallic element, B2 is a pentavalent metallic element, and M is at least one selected from the group consisting of Ti, Sn, Zr and Hf) and listed in Table 6 could be prepared. The raw powders were wet-blended in a ball mill for 16 hours. The mixture was dried and was calcined at 1200° C. for 3 hours to produce a calcined powder. After the calcination, the value of w was almost three.

Then, a translucent ceramic sample was produced in the same way as in Example 1. The linear transmittance, the refractive index, the Abbe number and the anomalous dispersion were evaluated in the same way. Table 6 shows the results.

TABLE 6

| Sample Number | Type of M | Type of B1 | Type of B2 | Type of B3 | s | x | y | z | z/y | v | Linear transmittance (%) 633 nm | Refractive index 633 nm | Abbe number $v_d$ | Anomalous dispersion $\Delta\theta$ g, F. |
|---|---|---|---|---|---|---|---|---|---|---|---|---|---|---|
| 201 | Zr | Y | Ta | Mg | 0.928 | 0.10 | 0.431 | 0.469 | 1.09 | 1.020 | 73.0 | 2.0746 | 29.7 | −0.020 |
| 202 | Zr | Y | Ta | Mg | 0.772 | 0.10 | 0.403 | 0.497 | 1.23 | 1.020 | 73.7 | 2.0761 | 29.8 | −0.019 |
| 203 | Zr | Y | Ta | ms | 0.593 | 0.10 | 0.375 | 0.525 | 1.40 | 1.020 | 74.2 | 2.0777 | 30.0 | −0.017 |
| 204 | Zr | Y | Ta | Mg | 0.385 | 0.20 | 0.309 | 0.491 | 1.59 | 1.020 | 74.8 | 2.0792 | 30.2 | −0.015 |
| 205 | Zr | Y | Ta | Mg | 0.139 | 0.25 | 0.266 | 0.484 | 1.82 | 1.020 | 76.0 | 2.0807 | 30.3 | −0.014 |
| 206 | Zr | Y | Ta | Mg | 0.149 | 0.25 | 0.248 | 0.502 | 2.02 | 1.020 | 42.1 | 2.0884 | 30.3 | −0.014 |
| 207 | Zr | Y | Ta | Mg | 0.031 | 0.25 | 0.224 | 0.526 | 2.35 | 1.020 | 29.5 | 2.0926 | 30.4 | −0.014 |
| 208 | Sn | Y | Ta | Mg | 0.772 | 0.10 | 0.403 | 0.497 | 1.23 | 1.020 | 74.0 | 2.0758 | 29.8 | −0.019 |
| 209 | Hf | Y | Ta | Mg | 0.772 | 0.10 | 0.403 | 0.497 | 1.23 | 1.020 | 73.1 | 2.0761 | 29.8 | −0.019 |
| 210 | Zr | Y | Ta | Zn | 0.854 | 0.10 | 0.417 | 0.483 | 1.16 | 1.015 | 70.8 | 2.0778 | 29.6 | −0.018 |
| 211 | Zr | In | Ta | Mg | 0.854 | 0.10 | 0.417 | 0.483 | 1.16 | 1.015 | 60.2 | 2.0961 | 30.4 | −0.017 |
| 212 | Zr | In | Ta | Zn | 0.854 | 0.10 | 0.417 | 0.483 | 1.16 | 1.015 | 57.3 | 2.0986 | 30.2 | −0.016 |
| 213 | Zr | Y | Ta | Mg | 0.854 | 0.10 | 0.417 | 0.483 | 1.16 | 1.000 | 37.5 | 2.0748 | 29.8 | −0.018 |
| 214 | Zr | Y | Ta | Mg | 0.854 | 0.10 | 0.417 | 0.483 | 1.16 | 1.035 | 68.5 | 2.0755 | 29.6 | −0.020 |
| 215 | Zr | Y | Ta | Mg | 0.854 | 0.10 | 0.417 | 0.483 | 1.16 | 1.050 | 53.8 | 2.0762 | 29.4 | −0.021 |
| 216 | Ti | Y | Ta | Mg | 0.141 | 0.40 | 0.213 | 0.387 | 1.82 | 1.010 | 61.8 | 2.1379 | 22.1 | −0.015 |
| 217 | Ti | Y | Ta | Mg | 0.141 | 0.80 | 0.071 | 0.129 | 1.82 | 1.005 | 33.1 | 2.2144 | 19.2 | −0.014 |
| 218 | Ti | Y | Ta | Mg | 0.132 | 0.85 | 0.053 | 0.097 | 1.82 | 1.005 | 21.0 | 2.2189 | 19.0 | −0.014 |

All the samples listed in Table 6 were within the scope of the present invention and had high anomalous dispersions in the range of −0.021 to −0.014. The sample numbers 217 and 218, in which the amount of x of Ti are large, had high refractive indices.

The present invention has been specifically described with reference to the examples. However, the embodiments of the present invention are not limited to these examples. For example, the raw materials are not limited to oxides or carbonates and may be any raw materials that can achieve desired characteristics of a sintered compact. In terms of the firing atmosphere, the oxygen content of about 95% by volume in the examples was most preferred under the conditions of the experimental apparatuses used. However, the oxygen content is not limited to about 95% by volume and it has been determined that a sintered compact having desired characteristics can be produced when the oxygen content is at least 90% by volume.

INDUSTRIAL APPLICABILITY

A translucent ceramic according to the present invention has a high linear transmittance, a high refractive index, a wide adjustable range of the refractive index and the Abbe number, and no birefringence, as well as a high anomalous dispersion. Hence, a translucent ceramic according to the present invention can advantageously be applied to an optical system in which the correction of chromatic aberration is important.

The invention claimed is:

1. A translucent ceramic comprising a component having a general formula of $Ba\{M_x(A)_yB2_z\}_vO_w$, wherein M is at least one member selected from the group consisting of Ti, Sn, Zr and Hf, B2 is a pentavalent metallic element, x+y+z=1, 0≦x≦0.9, 1.00≦z/y≦2.40, 1.00≦v≦1.05, w is a positive number required to maintain electroneutrality, and A is B1 or $(B1_sB3_{1-s})$ in which B1 is a trivalent metallic element, B3 is a bivalent metallic element and 0<s<1, provided that when A is B1, x≦0.45 and z/y≦1.04.

2. The translucent ceramic according to claim 1, wherein the linear transmittance of visible light having a wavelength of 633 nm through a mass of the translucent ceramic having a thickness of 0.4 mm is 20% or more.

3. The translucent ceramic according to claim 2, wherein the translucent ceramic is a polycrystal.

4. The translucent ceramic according to claim 1, wherein the translucent ceramic is a polycrystal.

5. The translucent ceramic according to claim 1, wherein M comprises Ti.

6. A translucent ceramic according to claim 1, wherein A is B1.

7. The translucent ceramic according to claim 2, wherein B1 is at least one member selected from the group consisting of Y, In, Sc, Tb, Ho and Sm, and B2 is at least one member selected from the group consisting of Ta and Nb.

8. The translucent ceramic according to claim 7, wherein the linear transmittance of visible light having a wavelength of 633 nm through a mass of the translucent ceramic having a thickness of 0.4 mm is 20% or more.

9. The translucent ceramic according to claim 7, wherein the translucent ceramic is a polycrystal.

10. The translucent ceramic according to claim 7, wherein M comprises Ti.

11. A translucent ceramic according to claim 1, wherein A is $(B1_sB3_{1-s})$.

12. The translucent ceramic according to claim 11, wherein B1 is at least one member selected from the group consisting of Y, In, Sc, Tb, Ho and Sm, B2 is at least one member selected from the group consisting of Ta and Nb, and B3 is at least one member selected from the group consisting of Mg and Zn.

13. The translucent ceramic according to claim 11, wherein the linear transmittance of visible light having a wavelength of 633 nm through a mass of the translucent ceramic having a thickness of 0.4 mm is 20% or more.

14. The translucent ceramic according to claim 11, wherein the translucent ceramic is a polycrystal.

15. The translucent ceramic according to claim 11, wherein M comprises Ti.

16. An optical component comprising the translucent ceramic according to claim 1.

17. The optical component according to claim 16 having an antireflection coating on a surface thereof.

18. An optical device comprising the optical component according to claim 16.

19. A method for manufacturing the translucent ceramic according to claim 1, comprising:

forming a ceramic raw powder into a green ceramic compact having a predetermined shape, the powder comprising a mixture of raw materials which after firing will produce a component have said formula;

providing a fired composition having substantially the same composition as the ceramic raw powder; and firing the green ceramic compact in an atmosphere containing at least 90% by volume of oxygen while the fired composition is in contact with the green ceramic compact.

\* \* \* \* \*